United States Patent
Wick et al.

(10) Patent No.: US 11,790,268 B1
(45) Date of Patent: Oct. 17, 2023

(54) CAUSAL INFERENCE MACHINE LEARNING WITH STATISTICAL BACKGROUND SUBTRACTION

(71) Applicant: Blue Yonder Group, Inc., Scottsdale, AZ (US)

(72) Inventors: Felix Christopher Wick, Thaleischweiler-Fröschen (DE); Michael Feindt, Karlsruhe (DE)

(73) Assignee: Blue Yonder Group, Inc., Scottsdale, AZ (US)

(*) Notice: Subject to any disclaimer, the term of this patent is extended or adjusted under 35 U.S.C. 154(b) by 136 days.

(21) Appl. No.: 17/107,087

(22) Filed: Nov. 30, 2020

Related U.S. Application Data

(60) Provisional application No. 62/960,268, filed on Jan. 13, 2020.

(51) Int. Cl.

| | |
|---|---|
| *G06Q 30/02* | (2023.01) |
| *G06N 20/00* | (2019.01) |
| *G06Q 30/0211* | (2023.01) |
| *G06Q 30/0202* | (2023.01) |
| *G06N 5/04* | (2023.01) |
| *G06Q 30/0207* | (2023.01) |

(52) U.S. Cl.
CPC ............... *G06N 20/00* (2019.01); *G06N 5/04* (2013.01); *G06Q 30/0202* (2013.01); *G06Q 30/0207* (2013.01); *G06Q 30/0211* (2013.01)

(58) Field of Classification Search
CPC ...... G06N 20/00; G06N 5/04; G06Q 30/0202; G06Q 30/0207; G06Q 30/0211
See application file for complete search history.

(56) References Cited

U.S. PATENT DOCUMENTS

| | | | | |
|---|---|---|---|---|
| 2019/0156357 A1* | 5/2019 | Palinginis | ............... | G06F 18/23 |
| 2019/0188536 A1* | 6/2019 | Lei | ............ | G06F 17/10 |
| 2020/0401643 A1* | 12/2020 | Liu | ....................... | G06F 16/906 |

OTHER PUBLICATIONS

University of Chicago, Sir Ronald A. Fisher "Design of Experiments" (Year: 1935).*
Felix Wick, Michael Feindt, Charm Baryon Spectroscopy (Year: 2011).*

(Continued)

*Primary Examiner* — Breffni Baggot
(74) *Attorney, Agent, or Firm* — Spencer Fane LLP; Steven J. Laureanti

(57) ABSTRACT

A system and method are disclosed to generate causal inference machine learning models employing statistical background subtraction. Embodiments include a server comprising a processor and memory. Embodiments receive historical sales data for one or more past time periods and corresponding historical data for one or more causal variables. Embodiments deconfound the cause-effect relationship of historical sales data and historical data on the one or more causal variables. Embodiments define one or more sample weights for statistical background subtraction of the historical data and perform statistical background subtraction on the historical data. Embodiments train a first machine learning model to predict an absolute individual causal effect on a considered demand quantity in relation to the one or more causal variables and one or more sample weights.

15 Claims, 8 Drawing Sheets

(56) References Cited

OTHER PUBLICATIONS

Machine Learning and Knowledge Discovery in Databases (Year: 2012).*
KIT Advanced event Reweighting for Multivariate Analysis (MVA) training (Year: 2011).*
Wiley Encyclopedia of Computer Science and Engineering (Year: 2009).*

* cited by examiner

CAUSAL INFERENCE MACHINE LEARNING WITH STATISTICAL BACKGROUND SUBTRACTION

CROSS-REFERENCE TO RELATED APPLICATIONS

The present disclosure is related to that disclosed in the U.S. Provisional Application No. 62/960,268, filed Jan. 13, 2020, entitled "Causal Inference Machine Learning with Statistical Background Subtraction." U.S. Provisional Application No. 62/960,268 is assigned to the assignee of the present application. The subject matter disclosed in U.S. Provisional Application No. 62/960,268 is hereby incorporated by reference into the present disclosure as if fully set forth herein. The present invention hereby claims priority under 35 U.S.C. § 119(e) to U.S. Provisional Application No. 62/960,268.

TECHNICAL FIELD

The present disclosure relates generally to data processing, and more in particular relates to data processing for retail and demand forecasting using causal inference machine learning with statistical background subtraction.

BACKGROUND

Machine learning techniques may generate one or more machine learning models that forecast demand for products or items sold at retail or from individual customers over a defined time period, or that provide other forecasts based on historical data. To forecast demand, machine learning models may model the influence of exterior causal factors, such as, for example, known holidays, sales promotions or discount coupons, or incoming weather events that may make customer travel to and from a retail location difficult, as a source of information separate from lagged target time series data. However, one or more confounding variables that affect both causal factors and the machine learning target may mask or dilute the effect of one or more causal factors, making it difficult for machine learning techniques to correctly identify and characterize the effect of causal factors and leading to undesirable or inaccurate cause-effect relationships.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
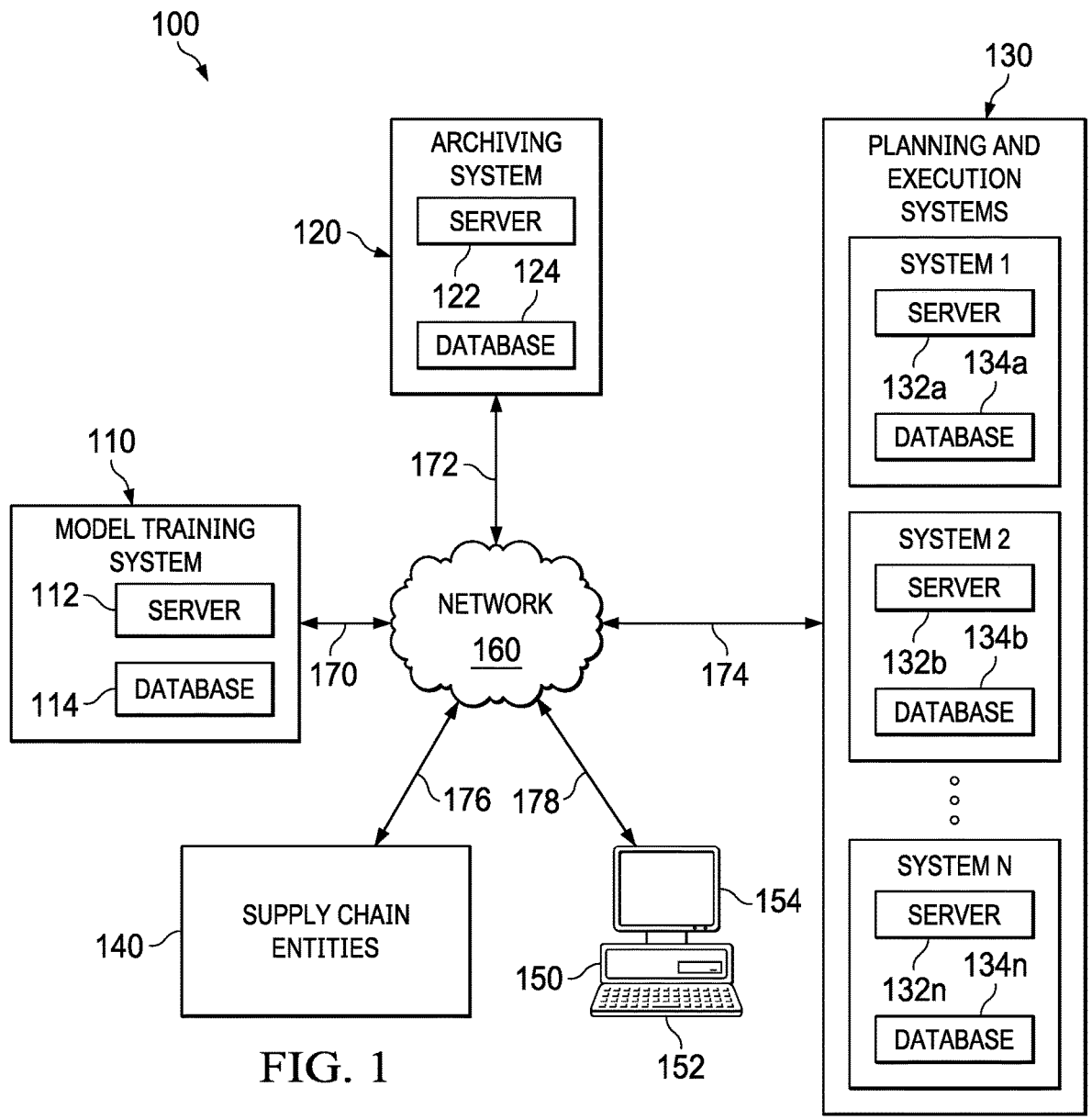
FIG. 1 illustrates an exemplary supply chain network, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In machine learning systems, a causal variable X may directly affect an effect variable Y. However, a confounding variable Z may affect both the causal variable X and the effect variable Y, and may dilute, mask, or overwhelm the effect of causal variable X on effect variable Y. It may be crucial for machine learning models to distinguish between the specific causal effect from a causal variable to be predicted in causal inference and the various causal factors represented as features in a machine learning model. In the case of the former, a full deconfounding may be required to properly describe the cause-effect relationship. For the latter, machine learning models make use of statistical dependencies in the data and may distribute causal effects on the target arbitrarily over several correlated features. For the purposes of this disclosure, the term causal factor is meant in a qualitative way and there may be significant deviations to the actual causal effect of a causal factor as a feature of the target variable due to confounding by other variables. However, a partial deconfounding can be achieved here as well by means of techniques described below.

The prediction of an individual causal effect on a considered demand quantity, such as gross margin from an individual customer over a given period of time, in relation to a causal variable, such as a personalized coupon, is a counterfactual task, because only one of the possibilities (for example, whether a particular coupon was sent to customers or not sent) can be true. Therefore, prediction of an individual causal effect requires generalized learning from a larger population of customers, a situation that may be appropriate for machine learning approaches.

As described below, embodiments of the following disclosure provide a model training system and method that generates one or more machine learning models. The model training system may apply one or more deconfounding actions to input data, such as, for example, by conducting a randomized controlled A/B group trial, to separate the effect of one or more causal variables from confounding variables in the input data. The one or more machine learning models may identify one or more causal factors X to predict an outcome volume Y (target or label). Having identified one or more causal factors and the outcomes influenced by the one or more causal factors, the model training system may generate and display graphs, charts, or other displays predicting the outcome of altering one or more causal factors.

Embodiments of the following disclosure enable machine learning models to quantify the individual causal effects of defined causal variables on considered outcomes while reducing or subtracting confounding variables that may dilute the effects of one or more causal variables. In turn, embodiments of the following disclosure enable inferences or predictions in causal what-if scenarios in which one or more causal variables are changed (such as, for example, mailing targeting coupons to selected customers in a customer database to influence product sales, or reducing prices for one or more products to stimulate increased sales). Embodiments may be distinguished from what-if scenarios that are based on changes of causal factors in the sense of features in a machine learning model, which represent the changes in the predictions due to the learned multivariate statistical dependencies and do not necessarily reflect the true cause-effect relationship.

Embodiments of the following disclosure enable the direct prediction of the absolute individual causal effect on a considered demand quantity, such as gross margin from an individual customer over a given period of time, in relation to a causal variable, such as a personalized coupon. Hereby, individualization is achieved by the generalization capabilities intrinsic to machine learning, and direct prediction of the causal effect is enabled by the background subtraction machine learning approach described in detail below.

FIG. 1 illustrates exemplary supply chain network 100, in accordance with a first embodiment. Supply chain network 100 comprises model training system 110, archiving system 120, one or more planning and execution systems 130, one or more supply chain entities 140, computer 150, network 160, and communication links 170-178. Although single model training system 110, single archiving system 120, one or more planning and execution systems 130, one or more supply chain entities 140, single computer 150, and single network 160 are illustrated and described, embodiments contemplate any number of model training systems 110, archiving systems 120, one or more planning and execution systems 130, one or more supply chain entities 140, computers 150, or networks 160, according to particular needs.

In one embodiment, model training system 110 comprises server 112 and database 114. As explained in more detail below, model training system 110 may, in an embodiment, conduct one or more randomized controlled A/B group trials to deconfound historical input data, and use a machine learning method with statistical background subtraction to train one or more machine learning models to enable individualization by means of function approximation and directly predict the absolute individual causal effect on the considered demand quantity from historical data or current data. Model training system 110 may receive historical data and current data from archiving system 120, one or more planning and execution systems 130, one or more supply chain entities 140, and/or computer 150 of supply chain network 100. In addition, server 112 comprises one or more modules that provide a user interface (UI) that displays visualizations identifying and quantifying the contribution of external causal factors to an individual prediction.

Archiving system 120 of supply chain network 100 comprises server 122 and database 124. Although archiving system 120 is illustrated as comprising single server 122 and single database 124, embodiments contemplate any suitable number of servers 122 or databases 124 internal to or externally coupled with archiving system 120. Server 122 may support one or more processes for receiving and storing data from one or more planning and execution systems 130, one or more supply chain entities 140, and/or one or more computers 150 of supply chain network 100, as described in more detail herein. According to some embodiments, archiving system 120 comprises an archive of data received from one or more planning and execution systems 130, one or more supply chain entities 140, and/or one or more computers 150 of supply chain network 100. Archiving system 120 provides archived data to model training system 110 and/or planning and execution system 130 to, for example, train a machine learning model or generate a prediction with a trained machine learning model. Server 122 may store the received data in database 124. Database 124 may comprise one or more databases 124 or other data storage arrangements at one or more locations, local to, or remote from, server 122.

According to an embodiment, one or more planning and execution systems 130 comprise server 132 and database 134. Supply chain planning and execution is typically performed by several distinct and dissimilar processes, including, for example, demand planning, production planning, supply planning, distribution planning, execution, transportation management, warehouse management, fulfilment, procurement, and the like. Server 132 comprises one or more modules, such as, for example, a planning module, a solver, a modeler, and/or an engine, for performing actions of one or more planning and execution processes. Server 132 stores and retrieves data from database 134 or from one or more locations in supply chain network 100. In addition, one or more planning and execution systems 130 operate on one or more computers 150 that are integral to or separate from the hardware and/or software that support archiving system 120, and one or more supply chain entities 140.

As shown in FIG. 1, supply chain network 100 comprising model training system 110, archiving system 120, one or more planning and execution systems 130, and one or more supply chain entities 140 may operate on one or more computers 150 that are integral to or separate from the hardware and/or software that support model training system 110, archiving system 120, one or more planning and execution systems 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, CD-ROM, in-memory device or other suitable media to receive output from and provide input to supply chain network 100.

One or more computers 150 may include one or more processors and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from model training system 110, archiving system 120, one or more planning and execution systems 130, and one or more supply chain entities 140. In addition, each of one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with model training system 110 and archiving system 120. These one or more users may include, for example, an "administrator" handling machine learning model training, administration of cloud computing systems, and/or one or more related tasks within supply chain network 100. In the same or another embodiment, one or more users may be associated with one or more planning and execution systems 130, and one or more supply chain entities 140.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although FIG. 1 illustrates and describes an example of supply chain network 100, embodiments contemplate any configuration of supply chain network 100, without departing from the scope described herein.

In one embodiment, model training system 110, archiving system 120, one or more planning and execution systems 130, supply chain entities 140, and computer 150 may be coupled with network 160 using one or more communication links 170-178, which may be any wireline, wireless, or other link suitable to support data communications between model training system 110, archiving system 120, the planning and execution systems 130, supply chain entities 140, computer 150, and network 160 during operation of supply chain network 100. Although communication links 170-178 are shown as generally coupling model training system 110, archiving system 120, one or more planning and execution systems 130, one or more supply chain entities 140, and computer 150 to network 160, any of model training system 110, archiving system 120, one or more planning and execution systems 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling model training system 110, archiving system 120, one or more planning and execution systems 130, one or more supply chain entities 140, and computer 150. For example, data may be maintained locally to, or externally of, model training system 110, archiving system 120, one or more planning and execution systems 130, one or more supply chain entities 140, and one or more computers 150 and made available to one or more associated users of model training system 110, archiving system 120, one or more planning and execution systems 130, one or more supply chain entities 140, and one or more computers 150 using network 160 or in any other appropriate manner. For example, data may be maintained in a cloud database 114 at one or more locations external to model training system 110, archiving system 120, one or more planning and execution systems 130, one or more supply chain entities 140, and one or more computers 150 and made available to one or more associated users of model training system 110, archiving system 120, one or more planning and execution systems 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Although the disclosed systems and methods are described below primarily in connection with causal factor inference machine learning with statistical background subtraction with respect to retail demand forecasting solely for the sake of clarity, the systems and methods described herein are applicable to many other applications for predicting a volume from a set of causal factors along with the contributions from each factor, including, for example, future stock and housing prices, insurance churn predictions, and drug discovery.

Figure 2:
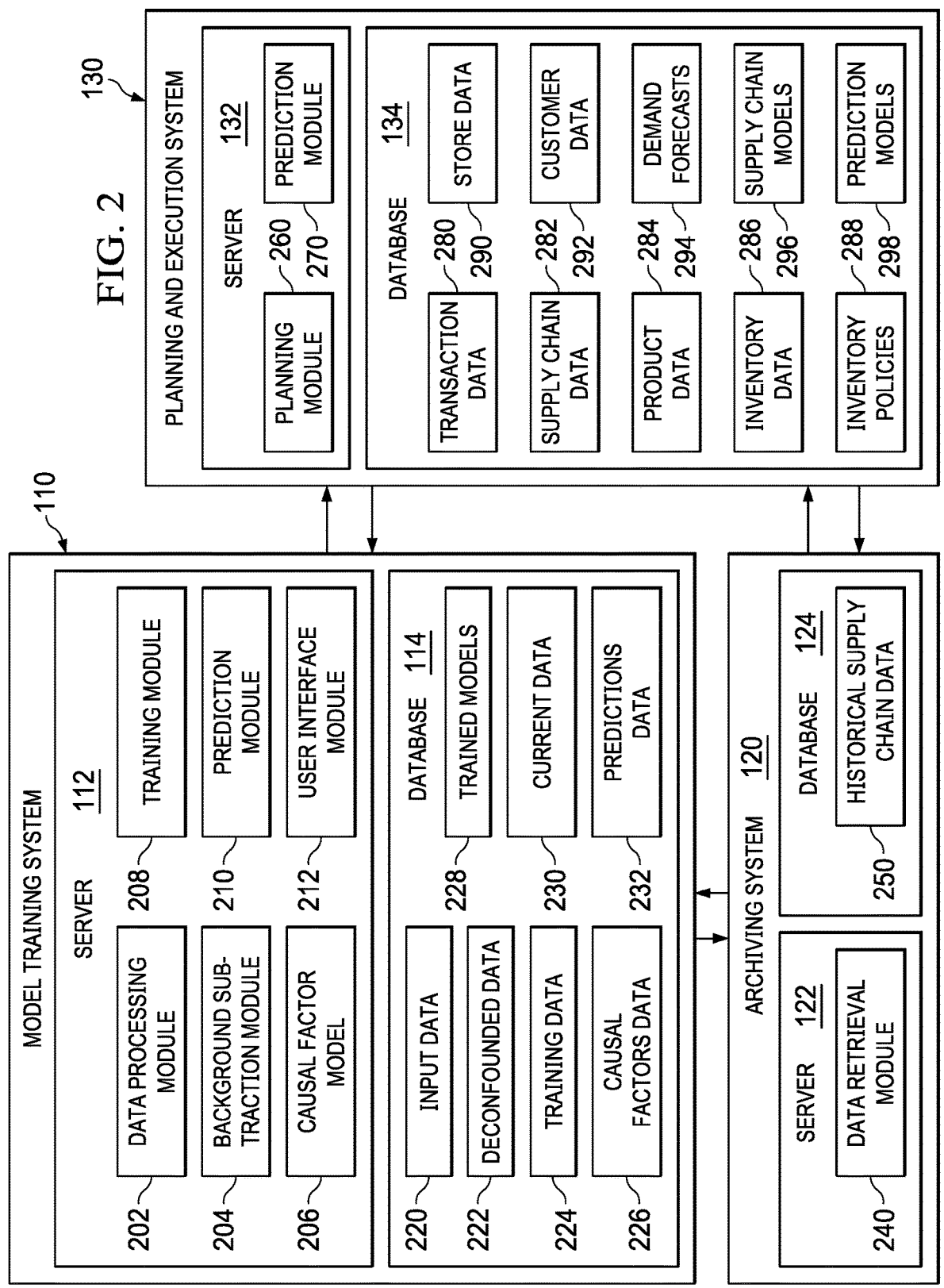
FIG. 2 illustrates the model training system, archiving system, and planning and execution system of FIG. 1 in greater detail, according to an embodiment.

FIG. 2 illustrates model training system 110, archiving system 120, and planning and execution system 130 of FIG. 1 in greater detail, in accordance with an embodiment. Model training system 110 may comprise server 112 and database 114, as described above. Although model training system 110 is illustrated as comprising single server 112 and single database 114, embodiments contemplate any suitable number of servers 112 or databases 114 internal to or externally coupled with model training system 110.

Server 112 comprises data processing module 202, background subtraction module 204, causal factor model 206, training module 208, prediction module 210, and user interface module 212. Although server 112 is illustrated and described as comprising single data processing module 202, single background subtraction module 204, single causal factor model 206, single training module 208, single prediction module 210, and single user interface module 212, embodiments contemplate any suitable number or combination of these located at one or more locations, local to, or remote from model training system 110, such as on multiple servers 112 or computers 150 at one or more locations in supply chain network 100.

Database 114 may comprise one or more databases 114 or other data storage arrangements at one or more locations, local to, or remote from, server 112. In an embodiment, database 114 comprises input data 220, deconfounded data 222, training data 224, causal factors data 226, trained models 228, current data 230, and predictions data 232. Although database 114 is illustrated and described as comprising input data 220, deconfounded data 222, training data 224, causal factors data 226, trained models 228, current data 230, and predictions data 232, embodiments contemplate any suitable number or combination of these, located at one or more locations, local to, or remote from, model training system 110 according to particular needs.

In one embodiment, data processing module 202 of model training system 110 receives data from archiving system 120, supply chain planning and execution systems 130, one or more supply chain entities 140, one or more computers 150, or one or more data storage locations local to, or remote from, supply chain network 100 and model training system 110, and prepares the received data for use in training causal factor model 206 and generating predictions data 232 from one or more trained models 228. Data processing module 202 prepares received data for use in training and prediction by checking received data for errors and transforming the received data. Data processing module 202 may check received data for errors in the range, sign, and/or value and use statistical analysis to check the quality or the correctness of the data. According to embodiments, data processing module 202 transforms the received data to normalize, aggregate, and/or rescale the data to allow direct comparison of received data from different planning and execution systems 130, and stores the received data and/or the transformed data in model training system 110 database 114 input data 220.

In an embodiment, data processing module 202 accesses input data 220 and performs one or more deconfounding actions to process input data 220 into deconfounded data 222. As described in greater detail below, historical supply chain data 250, customer data 292, and/or input data 220 may comprise one or more confounding variables ("confounders") that influence both independent variables (such as, for example, one or more causal factors) and dependent variables (such as, for example, one or more predictions and/or machine learning model outputs). By way of example only and not by way of limitation, in an embodiment in which model training system 110 models the effect of issuing a discount coupon (a causal factor independent variable) on item sales (a dependent variable influenced by, among other independent variables, the presence or absence of a discount coupon), the day of the week may operate as a confounder (influencing item sales volume and potentially masking or diluting the effect the discount coupon causal factor had on item sales). In an embodiment, data processing module 202 may deconfound input data 220 to reduce the influencing effect of one or more confounders on one or more independent variables, causal factors, and/or other variables or data stored in input data 220 and to enable model training system 110 to identify, isolate, and model the absolute effect of one or more causal variables without the diluting effect of one or more confounders.

In an embodiment, data processing module 202 may conduct one or more randomized controlled A/B group trials to deconfound input data 220 and generate deconfounded data 222. In other embodiments, data processing module 202 may use any statistical deconfounding technique, such as independence weighting with inverse propensity scores, to deconfound input data 220 and generate deconfounded data 222, according to particular needs.

In an embodiment, randomized controlled trials may be the safest way to achieve full deconfounding, as the distribution of the considered prediction granularity, for example customers or items, to the groups is done randomly, which may result in the removal of all causal effect from potential confounding variables.

Independence weighting with inverse propensity scores may provide an alternative for deconfounding when a randomized controlled trial is not feasible, for example learning purely from historical data that was generated by one or more action policies. Independence weighting may comprise, for example, an additional training and prediction step to calculate and apply the historic data independence weights in form of inverse propensity scores. The propensity scores may be estimated as outcomes of a separate machine learning model predicting the values of the considered causal variable, for example the sending of a personalized coupon, according to the historical action policy by including all potential confounding variables as features. The so-calculated independence weights may then be used as sample weights in the machine learning trainings for the prediction of the individual causal effects.

Yet another alternative for, at least partial, deconfounding between several features and the target of a machine learning model according to specific causal assumptions may be the use of regularization and smoothing techniques during the training of the machine learning model and/or the specification of a feature sequence in combination with a coordinate descent optimization of the machine learning algorithm, as may be used, for example, in cyclic boosting. An example for the regularization/smoothing approach is to restrict the learning of the causal factor between a feature describing the seasonality over the year and the target to a smooth sinusoidal dependency, letting spikes in the corresponding distribution be described by the causal variable promotional price reduction, which is another feature of the machine learning model.

In an embodiment, background subtraction module 204 accesses deconfounded data 222, determines weights for statistical background subtraction in the subsequent machine learning model on deconfounded data 222, and generates training data 224, according to embodiments. In an embodiment, background subtraction module 204 assigns one or more positive and/or negative sample weights to one or more samples of the considered population of the randomized controlled A/B group trials to statistically subtract non-influenced and/or non-relevant data from influenced and/or relevant data in the subsequent machine learning training. Samples from group A may be assigned a weight 1 multiplied with a potential other weight to equalize the number of samples in groups A and B, and samples from group B may be assigned a weight −1 accordingly multiplied with an equalization weight. Having generated training data 224, background subtraction module 204 stores training data 224 in model training system 110 database 114.

Causal factor model 206 comprises an untrained model used by training module 208 to generate one or more trained models 228. In an embodiment, cyclic boosting in additive regression mode is used as machine learning algorithm. The weights determined by background subtraction module 204 are thereby used as sample weights in order to perform a kind of statistical background subtraction, because samples from group A, signal, receive a positive weight, for example 1, and samples from group B, background, receive a negative weight, for example −1. This corresponds to multiplying positive and negative values to the demand quantity to be predicted, for example gross margin from an individual customer, and results in directly learning the difference of the absolute potential outcomes expected for the case of signal and background, meaning active or not active causal variable, for example sending of a personalized coupon. This may correspond to a prediction of the absolute individual causal effect, a target only known statistically, as it represents a counterfactual statement. According to one embodiment, causal factor model 206 is trained from training data 224 to predict a volume Y (target or label) from a set of identified causal factors X that describe the strength of each factor variable contributing to causal factor model 206 prediction, where, as described above, for the use case of causal inference described here, the target Y is the considered demand quantity multiplied by the corresponding background subtraction weight and the prediction of Y represents the absolute individual causal effect.

Training module 208 uses training data 224 to train causal factor model 206 by identifying causal factors and generating one or more trained models 228. As described in more detail below, training module 208 uses causal factor model 206 to calculate causal factors and the effects of causal factors from training data 224.

Prediction module 210 applies samples of current data 230 to trained models 228 to generate predictions stored as predictions data 232. As described in more detail below, prediction module 210 predicts a volume Y (target or label) from a set of causal factors X along with causal factors strengths that describe the strength of each causal factor variable contributing to the predicted volume. For the purposes of this disclosure, the meaning of volume Y is the same as described above for causal factor model 206. Prediction module 210 may generate one or more what-if volume predictions from sets of hypothetical causal factors X. According to some embodiments, prediction module 210 generates predictions at daily intervals. However, embodiments contemplate longer and shorter prediction phases that may be performed, for example, weekly, twice a week, twice a day, hourly, or the like.

User interface module 212 of model training system 110 generates and displays a user interface (UI), such as, for example, a graphical user interface (GUI), that displays one or more interactive visualizations of predictions and the contribution from one or more causal factors to the prediction. According to embodiments, user interface module 212 displays a GUI comprising interactive graphical elements for selecting one or more items, stores, or customers and, in response to the selection, displaying one or more graphical elements identifying one or more causal factors and the relative importance of the retrieved one or more causal factors to the prediction of the absolute individual causal effect on the considered demand quantity. Further, user interface module 212 may display interactive graphical elements provided for modifying future states of the one or more identified causal factors, and, in response to modifying the one or more future states of the causal factors, modifying input values to represent a future scenario corresponding to the modified futures states of the one or more causal factors. For example, embodiments of user interface module 212 provide what-if scenario modeling and prediction for modifying a future promotion variable to identify and calculate the change in a prediction based on a change in promotional strategy using historical supply chain data 250. A proper distinction between causal factors and lagged target information may be crucial for what-if scenarios, because the target autocorrelation is a spurious correlation due to the effect of the causal factors.

Input data 220 of model training system 110 database 114 comprises a selection of one or more periods of historical supply chain data 250 aggregated or disaggregated at various levels of granularity. According to one embodiment, input data 220 comprises historic time series data, such as sales patterns, prices, promotions, weather conditions, and other factors influencing future demand of a particular item sold in a given store on a specific day. In an embodiment, model training system 110 may receive input data 220 from archiving system 120, one or supply chain planning and execution systems 130, one or more supply chain entities 140, computer 150, or one or more data storage locations local to, or remote from, supply chain network 100 and model training system 110.

Deconfounded data 222 comprises deconfounded data generated by data processing module 202. In an embodiment, historical supply chain data 250, customer data 292, input data 220, and/or other data stored in database 114 may comprise one or more confounding variables ("confounders") that influence both independent variables (such as, for example, one or more causal factors) and dependent variables (such as, for example, one or more predictions and/or machine learning model outputs). In an embodiment, data processing module 202 may deconfound input data 220 to isolate or reduce the influencing effect of one or more confounders from one or more independent variables, causal factors, and/or other variables or data stored in input data 220, and may store the generated deconfounded data in deconfounded data 222 of model training system 110 database 114.

Training data 224 comprises deconfounded data 222 and weights used for the statistical background subtraction. In an embodiment, training module 208 accesses training data 224 and inputs training data 224 into causal factor model 206 to generate one or more trained models 228.

Causal factors data 226 comprises one or more horizon-independent causal factors identified by training module 208 in the process of training causal factor model 206. For the purposes of training causal factor model 206, causal factors represent exterior factors that may positively or negatively influence the target described above.

According to embodiments, causal factors may comprise, for example, any exterior factor that positively or negatively influences the absolute individual causal effect, such as: sales promotions, traditional heavy shopping days (such as but not limited to "Black Friday"), weather events (such as, for example, a heavy storm raining out roads, decreasing customer traffic and subsequent sales), political events (such as, for example, tax refunds increasing disposable customer income, or trade tariffs increasing the price of imported goods), and/or the day of the week (as a causal factor and not as lagged target time series information), or other factors influencing sales.

Trained models 228 may comprise one or more causal factor models 206 trained from training data 224 to predict absolute individual causal effects (such as, for example, positive or negative effects on gross margin from individual customers as reaction to coupon targeting) along with causal factors and the contributing strength of each causal factor variable in contributing to the prediction.

Current data 230 comprises data used to generate a prediction from trained models 228. According to embodiments, current data 230 comprises current sales patterns, prices, promotions, weather conditions, and other current factors influencing demand of a particular item sold in a given store on a specific day or of a particular customer. Current data 230 may also comprise one or more what-if scenarios, in which one or more causal factors or other data are altered from one or more baselines or measured values.

Predictions data 232 may comprise one or more absolute individual causal effects as predictions, as well as the contributions from one or more causal factors used by prediction module 210 to generate one or more predictions. According to one embodiment, predictions data 232 comprises a predicted volume Y (target or label) predicted from a set of causal factors X. In other embodiments, predictions data 232 comprises a what-if predicted volume Y predicted from sets of hypothetical causal factors X.

As described above, archiving system 120 comprises server 122 and database 124. Although archiving system 120 is illustrated as comprising single server 122 and single database 124, embodiments contemplate any suitable number of servers 122 or databases 124 internal to or externally coupled with archiving system 120.

Server 122 comprises data retrieval module 240. Although server 122 is illustrated and described as comprising single data retrieval module 240, embodiments contemplate any suitable number or combination of data retrieval modules 240 located at one or more locations, local to, or remote from archiving system 120, such as on multiple servers 112 or computers 150 at one or more locations in supply chain network 100.

In one embodiment, data retrieval module 240 receives historical supply chain data 250 from one or more supply chain planning and execution systems 130 and one or more supply chain entities 140, and stores the received historical supply chain data 250 in database 124. According to one embodiment, data processing module 202 of model training system 110 may prepare historical supply chain data 250 for use as input data 220 by checking historical supply chain data 250 for errors and transforming historical supply chain data 250 to normalize, aggregate, and/or rescale historical supply chain data 250 to allow direct comparison of data received from different planning and execution systems 130, one or more supply chain entities 140, and/or one or more other locations local to, or remote from, archiving system 120. According to embodiments, data retrieval module 240 receives data from one or more sources external to supply chain network 100, such as, for example, weather data, special events data, social media data, calendar data, and the like and stores the received data as historical supply chain data 250.

Database 124 of archiving system 120 may comprise one or more databases 124 or other data storage arrangements at one or more locations, local to, or remote from, server 122. Database 124 comprises, for example, historical supply chain data 250. Although database 124 is illustrated and described as comprising historical supply chain data 250, embodiments contemplate any suitable number or combination of data, located at one or more locations, local to, or remote from, archiving system 120, according to particular needs.

Historical supply chain data 250 comprises historical data received from model training system 110, archiving system 120, one or more supply chain planning and execution systems 130, one or more supply chain entities 140, and/or computer 150. Historical supply chain data 250 may comprise, for example, weather data, special events data, social media data, calendar data, and the like. In an embodiment, historical supply chain data 250 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As described above, each of one or more planning and execution systems 130 comprises server 132 and database 134. Although planning and execution system 130 is illustrated as comprising single server 132 and single database 134, embodiments contemplate any suitable number of servers 132 or databases 134 internal to or externally coupled with planning and execution system 130.

Server 132 comprises planning module 260 and prediction module 270. Although server 132 is illustrated and described as comprising single planning module 260 and single prediction module 270, embodiments contemplate any suitable number or combination of planning modules 260 and prediction modules 270 located at one or more locations, local to, or remote from planning and execution system 130, such as on multiple servers 112 or computers 150 at one or more locations in supply chain network 100.

Database 134 may comprise one or more databases 134 or other data storage arrangements at one or more locations, local to, or remote from, server 112. Database 134 comprises, for example, transaction data 280, supply chain data 282, product data 284, inventory data 286, inventory policies 288, store data 290, customer data 292, demand forecasts 294, supply chain models 296, and prediction models 298. Although database 134 is illustrated and described as comprising transaction data 280, supply chain data 282, product data 284, inventory data 286, inventory policies 288, store data 290, customer data 292, demand forecasts 294, supply chain models 296, and prediction models 298, embodiments contemplate any suitable number or combination of data, located at one or more locations, local to, or remote from, supply chain planning and execution system 130, according to particular needs.

Planning module 260 of planning and execution system 130 works in connection with prediction module 270 to generate a plan based on one or more predicted retail volumes, classifications, or other predictions. By way of example and not of limitation, planning module 260 may comprise a demand planner that generates a demand forecast for one or more supply chain entities 140. Planning module 260 may generate the demand forecast, at least in part, from predictions and calculated factor values for one or more causal factors received from prediction module 270. By way of a further example, planning module 260 may comprises an assortment planner and/or a segmentation planner that generates product assortments that match causal effects calculated for one or more customers or products by prediction module 270, which may provide for increased customer satisfaction and sales, as well as reducing costs for shipping and stocking products at stores where they are unlikely to sell.

According to embodiments, prediction module 270 applies samples of transaction data 280, supply chain data 282, product data 284, inventory data 286, store data 290, customer data 292, demand forecasts 294, and other data to prediction models 298 to generate predictions and calculated factor values for one or more causal factors. In an embodiment, and as described above in connection with prediction module 210 of model training system 110, prediction module 270 of planning and execution system 130 predicts a volume Y (target or label) from a set of causal factors X along with causal factors strengths that describe the strength of each causal factor variable contributing to the predicted volume. According to some embodiments, prediction module 270 generates predictions at daily intervals. However, embodiments contemplate longer and shorter prediction phases that may be performed, for example, weekly, twice a week, twice a day, hourly, or the like.

Transaction data 280 of planning and execution system 130 database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like.

Supply chain data 282 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 284 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 286 in database 134, which may be used by planning and execution system 130 to place orders, set inventory levels at one or more stocking points, initiate manufacturing of one or more components, or the like in response to, and based at least in part on, a forecasted demand of model training system 110.

Inventory policies 288 may comprise any suitable inventory policy describing the reorder point and target quantity, or other inventory policy parameters that set rules for model training system 110 and/or planning and execution system 130 to manage and reorder inventory. Inventory policies 288 may be based on target service level, demand, cost, fill rate, or the like. According to embodiments, inventory policies 288 comprise target service levels that ensure that a service level of one or more supply chain entities 140 is met with a set probability. For example, one or more supply chain entities 140 may set a service level at 95%, meaning supply chain entities 140 will set the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, model training system 110 and/or planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s,S) inventory policy. Other inventory policies 288 may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data.

Customer data 292 may comprise customer identity information, including, for example, customer relationship management data, loyalty programs, and mappings between product purchases and one or more customers so that a customer associated with a transaction may be identified. Customer data 292 may comprise data relating customer purchases to one or more products, geographical regions, store locations, or other types of dimensions.

Demand forecasts 294 may indicate future expected demand based on, for example, any data relating to past sales, past demand, purchase data, promotions, events, or the like of one or more supply chain entities 140. Demand forecasts 294 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According to embodiments, one or more causal factor models 206 and/or trained models 228 may account for the shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. If each location of this exemplary supermarket is open every day of the year, planning and execution system 130 would need to calculate approximately 2×10^10 demand forecasts each day to derive the optimal order volume for the next delivery cycle (e.g. three days).

Supply chain models 296 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 296 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Prediction models 298 comprise one or more of trained models 228 used by planning and execution system 130 for predicting, among other variables, pricing, targeting, or retail volume, such as, for example, a forecasted demand volume for one or more items at one or more stores of one or more retailers.

Figure 3:
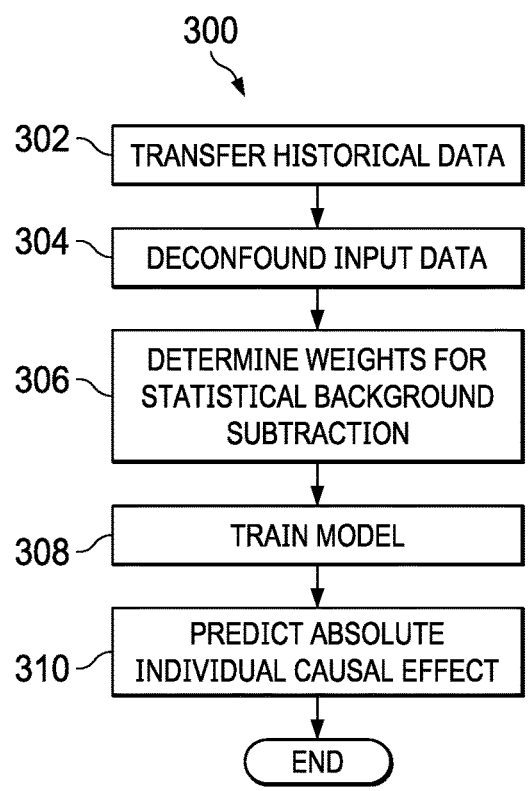
FIG. 3 illustrates an exemplary method of predicting a volume from a set of causal inferences with statistical background subtraction, according to an embodiment.

FIG. 3 illustrates exemplary method 300 of predicting a volume from a set of causal inferences with statistical background subtraction, in accordance with an embodiment. Method 300 proceeds by one or more actions, which although described in a particular order, may be performed in one or more permutations, according to particular needs.

At action 302, data processing module 202 of model training system 110 server 112 transfers historical supply chain data 250 from archiving system 120, and/or customer data 292 from planning and execution system 130, into input data 220 of model training system 110 database 114. In other embodiments, data retrieval module 240 of archiving system 120 may transfer historical supply chain data 250 from archiving system 120 to input data 220 of model training system 110 database 114.

At action 304, data processing module 202 accesses input data 220, deconfounds input data 220, and stores the deconfounded input data in deconfounded data 222 of model training system 110 database 114. In an embodiment, data processing module 202 may conduct one or more randomized controlled A/B group trials to deconfound input data 220 and generate deconfounded data 222. According to embodiments, a randomized controlled A/B group trial may comprise randomly selecting, from a data population, an A group and a B group within which to test the effect of one or more causal factors. In other embodiments, data processing module 202 may use any statistical deconfounding technique, such as independence weighting with inverse propensity scores, to deconfound input data 220 and generate deconfounded data 222 without conducting one or more randomized controlled A/B group trials, according to particular needs.

By way of example only and not by way of limitation, in an embodiment, input data 220 of model training system 110 database 114 may comprise a customer database of customers who have previously visited a retail store, and causal factors data 226 may comprise, among other causal factors, a discount coupon causal variable that may influence the behavior of the customers and the likelihood that one or more customers will return to the store in a given time period. Continuing the example, at action 304 of method 300, data processing module 202 deconfounds input data 220 by randomly selecting, from within customer database, two groups of customers, Group A and Group B. In this example, data processing module 202 sends a discount coupon to all the customers selected in Group A, and no coupons to any customers selected in Group B. Data processing module 202 stores, in deconfounded data 222, the behavior of the Group A and Group B customers over the time period in which the discount coupon is active. Model training system 110 may use the differences in behavior in Group A and Group B customers to identify and predict the effect the discount coupon causal variable had on customer behavior. Although the example described herein comprises a randomized controlled A/B group trial conducted in a retail environment with a discount coupon causal variable, the systems and methods described herein are applicable to many other applications for deconfounding data with one or more randomized controlled A/B group trials, according to particular needs.

At action 306, background subtraction module 204 accesses deconfounded data 222, determines weights for statistical background subtraction on deconfounded data 222, and generates training data 224, according to embodiments. In an embodiment, background subtraction module 204 assigns one or more positive and/or negative sample weights to one or more sample populations of the randomized controlled A/B group trials to statistically subtract non-influenced and/or non-relevant data from influenced and/or relevant data during the subsequent model training.

By way of example only and not by way of limitation, in an embodiment, data processing module 202 stores in deconfounded data 222 customer behavior (in this example, whether a customer visited a retail store) of Group A customers (comprising 100 customers who received a discount coupon) and Group B customers (comprising 100 customers who did not receive a discount coupon) over the time period in which the discount coupon is active. In this example, 80 Group A customers visited the store during the relevant time period, and 65 Group B customers visited the store during the relevant time period. However, the fact that 80 Group A customers visited the store does not automatically suggest that the discount coupon causal variable results in 80 customers visiting the store out of 100 customers who receive a discount coupon, because some of the Group A customers might have visited the store even if the Group A customers had not received the discount coupon. To apply statistical background subtraction, at action 306 of method 300, background subtraction module 204 assigns a positive sample weight to Group A, and a negative sample weight to Group B and stores these weights in training data 224 of database 114. Although the example described herein comprises a particular statistical background subtraction applied to a randomized controlled A/B group trial conducted in a retail environment with a discount coupon causal variable, the systems and methods described herein are applicable to many other applications for statistical background subtraction of one or more randomized controlled A/B group trials, according to particular needs.

Continuing the example of the previous paragraph in which 100 customers in Group A received a discount, and the discount may have resulted in 15 additional Group A customers visiting the store who would not have done so otherwise, model training system 110 may calculate the cost of sending 100 discounts to customers in exchange for bringing 15 additional customers into the store. In an embodiment in which the cost of a discount is $5.00 off a single product sale, and a customer purchases an average of $45.00 worth of products per store visit, sending 100 customers a discount to bring 15 additional customers into the store generates a total cost of $400.00 ($5.00 in reduced purchase price per coupon×100 coupons×0.8 coupon utilization rate in this particular example) and additional gross revenue of $675.00 (15 additional customers×$45.00 average customer spending per store visit), for a total gross coupon margin of $275.00 ($675.00 gross revenue−$400.00 coupon costs). There is also the possibility of negative gross margins, in which the cost of implementing one or more coupons outweigh the additional revenue generated by the one or more coupons.

At action 308, training module 208 generates and trains one or more trained models 228 using training data 224. In an embodiment, training module 208 accesses training data 224 and uses it to train causal factor model 206 and generate one or more trained models 228 by identifying, from training data 224, one or more causal factors as well as the strengths with which each of the one or more causal factors contributes to the predicted volume output of the one or more trained models 228. According to embodiments, training module 208 may use any machine learning process capable of modeling data with positive and negative sample weights, including but not limited to a cyclic boosting process, to identify one or more causal factors, train causal factor model 206, and/or generate one or more trained models 228. Training module 208 identifies causal factors and stores the causal factors in causal factors data 226. Training module 208 stores the one or more trained models 228 in trained models 228 of model training system 110 database 114.

At action 310, prediction module 210 uses one or more trained models 228 to predict a target variable. A prediction process may comprise, for example, predicting the absolute individual causal effect of a price change on a given item in a given store over a defined time period. Prediction module 210 may access current data 230, such as, for example, current sales patterns, prices, promotions, weather conditions, and other current factors influencing demand of a particular item sold in a given store on a specific day, and may input current data 230 to one or more trained models 228. Prediction module 210 may apply current data 230 to one or more trained models 228 to generate one or more target variable predictions, and may also generate a prediction with an explanation of the strength with which each of the one or more causal factors influences the prediction. Having generated one or more target variable predictions, prediction module 210 stores the target variable predictions in predictions data 232. User interface module 212 may access predictions data 232, and may generate one or more charts, graphs, or other displays to display predictions data 232. In an embodiment, user interface module 212 may display interactive graphical elements providing for modifying future states of the one or more identified causal factors, and, in response to modifying the one or more future states of the causal factors, modifying input values to represent a future scenario corresponding to the modified futures states of the one or more causal factors. Model training system 110 may then terminate method 300.

To illustrate the operation of model training system 110 generating a trained model that predicts a volume from a set of causal inferences with statistical background subtraction, the following example is now given. In this example, model training system 110 executes the actions of method 300 to (1) conduct a data-deconfounding randomized controlled A/B group trial, (2) determine weights for statistical background subtraction to prepare the A/B group trial data for model training, and (3) generate a trained model that identifies the effect that a price discount coupon may have on the behavior of a group of individual customers. Although particular examples of model training system 110, randomized controlled A/B group trials, statistical background subtraction, and trained models are illustrated and described herein, embodiments contemplate model training system 110 executing the actions of method 300 to identify any causal effects, conduct any data deconfounding technique or any statistical background subtraction technique, and generate any trained models, according to particular needs.

In this example, at action 302, model training system 110 data processing module 202 transfers historical product sales data, including customer data 292 comprising the frequency at which a selection of customers visit a particular retail store ("Store X"), from planning and execution system 130 into input data 220 of model training system 110 database 114. In this example, input data 220 includes a customer database of 10,000 individual customers who have visited Store X and purchased an item between Nov. 1, 2018 and Nov. 1, 2019.

Continuing the example, at action 304, data processing module 202 accesses input data 220, including customer database of 10,000 customers. Data processing module 202 conducts a randomized controlled A/B group trial to investigate the effect a price reduction coupon has on the number of customers who return to Store X to make a second purchase. To begin the randomized controlled A/B group trial, data processing module 202 randomly selects two groups (in this example, Group A and Group B), each comprising 500 customers, from within the total 10,000 customer database. In this example, data processing module 202 sends a price discount coupon that must be redeemed in-store, valid from Dec. 1-Dec. 31, 2019, to every customer in Group A. Data processing module 202 sends no coupons to Group B. When the price discount promotion terminates on Dec. 31, 2019, data processing module 202 stores, in deconfounded data 222, the sales data of customers from Group A and the sales data of customers from Group B who visited Store X from Dec. 1-Dec. 31, 2019.

Figure 4:
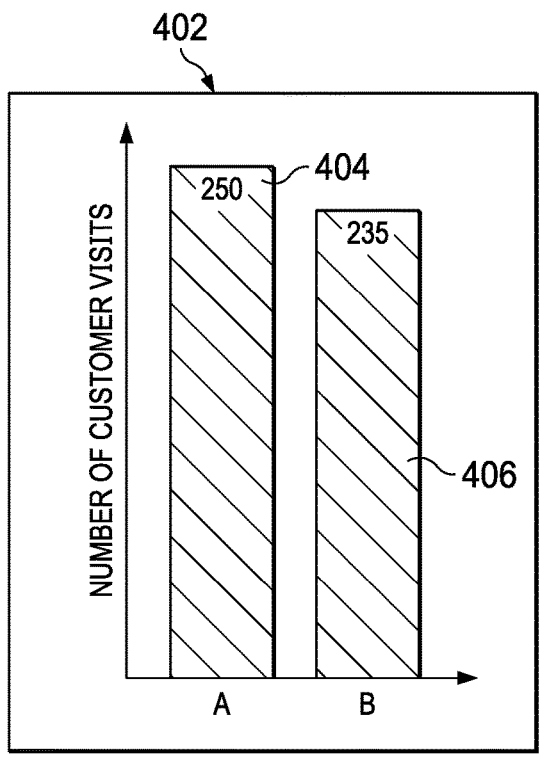
FIG. 4 illustrates a customer data display, according to an embodiment.

FIG. 4 illustrates customer data display 402, according to an embodiment. In this embodiment, user interface module 212 generates customer data display 402, comprising a bar graph indicating the number of Group A customers (illustrated by Group A bar 404) and Group B customers (illustrated by Group B bar 406) that visited Store X during the specified time period. Although particular examples of customer data displays 402 are illustrated and described herein, embodiments contemplate user interface module 212 accessing model training system 110 database 114 data, including but not limited to deconfounded data 222, and generating customer data displays 402 of any configuration and displaying any database 114 data, according to particular needs.

Continuing with this example, 250 Group A customers, illustrated by Group A bar 404, visited Store X from Dec. 1-Dec. 31, 2019. 235 customers from Group B, illustrated by Group B bar 406, visited Store X from Dec. 1-Dec. 31, 2019. Data processing module 202 stores the Group A and Group B visit data in deconfounded data 222 of model training system 110 database 114. At action 306, background subtraction module 204 accesses the Group A and Group B visit data in deconfounded data 222, determines weights for statistical background subtraction on the Group A and Group B visit data, and generates training data 224 based, in part, on the Group A and Group B visit data. In this example, background subtraction module 204 assigns to training data 224 a positive sample weight of 1 to Group A (comprising customers that received a price discount coupon for the Dec. 1-Dec. 31, 2019 time period and visited Store X during the Dec. 1-Dec. 31, 2019 time period), and a negative sample weight of −1 to Group B (comprising customers that did not receive any price discount coupons but still visited Store X during the Dec. 1-Dec. 31, 2019 time period).

Figure 5:
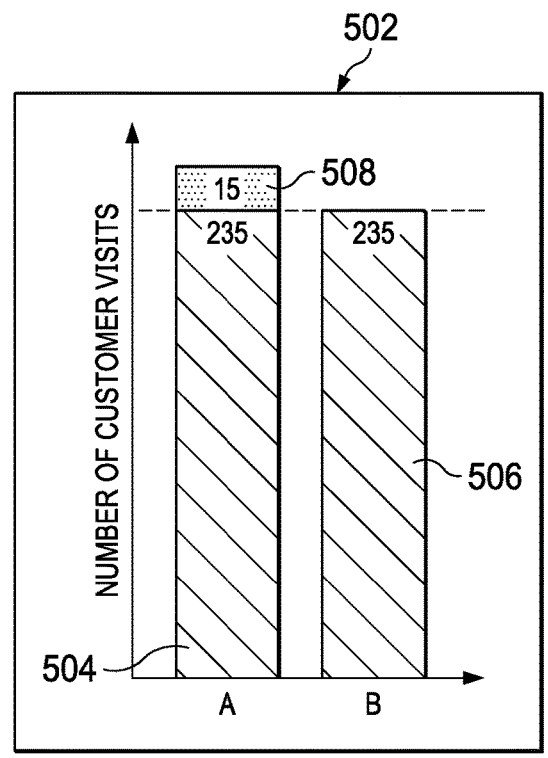
FIG. 5 illustrates a weighted customer data display, according to an embodiment.

FIG. 5 illustrates weighted customer data display 502, according to an embodiment. In this embodiment, user interface module 212 generates weighted customer data display 502, comprising a bar graph indicating the number of Group A and Group B customers (illustrated by Group A bar 504 and Group B bar 506, respectively) that visited Store X during the Dec. 1-Dec. 31, 2019 time period, with the additional customers that visited from Group A as compared to Group B illustrated by additional customers bar 508. Although particular examples of weighted customer data displays 502 are illustrated and described herein, embodiments contemplate user interface module 212 accessing model training system 110 database 114 data, including but not limited to deconfounded data 222, and generating weighted customer data displays 502 of any configuration and displaying any database 114 data, according to particular needs.

Continuing with this example, and at action 308 of method 300, training module 208 trains a machine learning model using training data 224. Training module 208 accesses training data 224, which in this example includes Group A and Group B visit data, price discount coupon causal factor data, and sample weights to be used for statistical background subtraction generated by background subtraction module 204 during action 306. Training module 208 uses training data 224 to train causal factor model 206 and generate one or more trained models 228 by identifying, from training data 224, one or more causal factors (not to be confused with the causal variable price discount coupon in this example) as well as the strengths with which each of the one or more causal factors contributes to the individual predicted volume output of the one or more trained models 228. In this example, the average causal effect on the full population is a 3% increase in customer visits, or 15 additional visits for 500 coupons sent. According to embodiments, training module 208 may use any machine learning process capable of modeling data with positive and negative sample weights, including but not limited to a cyclic boosting process, to identify the price discount coupon causal effect on customer visits, train causal factor model 206, and/or generate one or more trained models 228. Training module 208 stores the trained model in trained models 228 of model training system 110 database 114.

Concluding the example, and at action 310, prediction module 210 uses the trained model to predict a target variable (in this example, additional customer visits if 1,000 coupons are sent to previous Store X customers). Prediction module 210 accesses current data 230, which in this example comprises (1) customer database of 10,000 individual customers and (2) the number of price discount coupons to be transmitted to customers in customer database (in this example, 1,000 coupons). Prediction module 210 applies current data 230 to the trained model. Prediction module 210 stores the predictions for each individual customer generated by the trained model in predictions data 232. Model training system 110 then terminates method 300.

Figure 6:
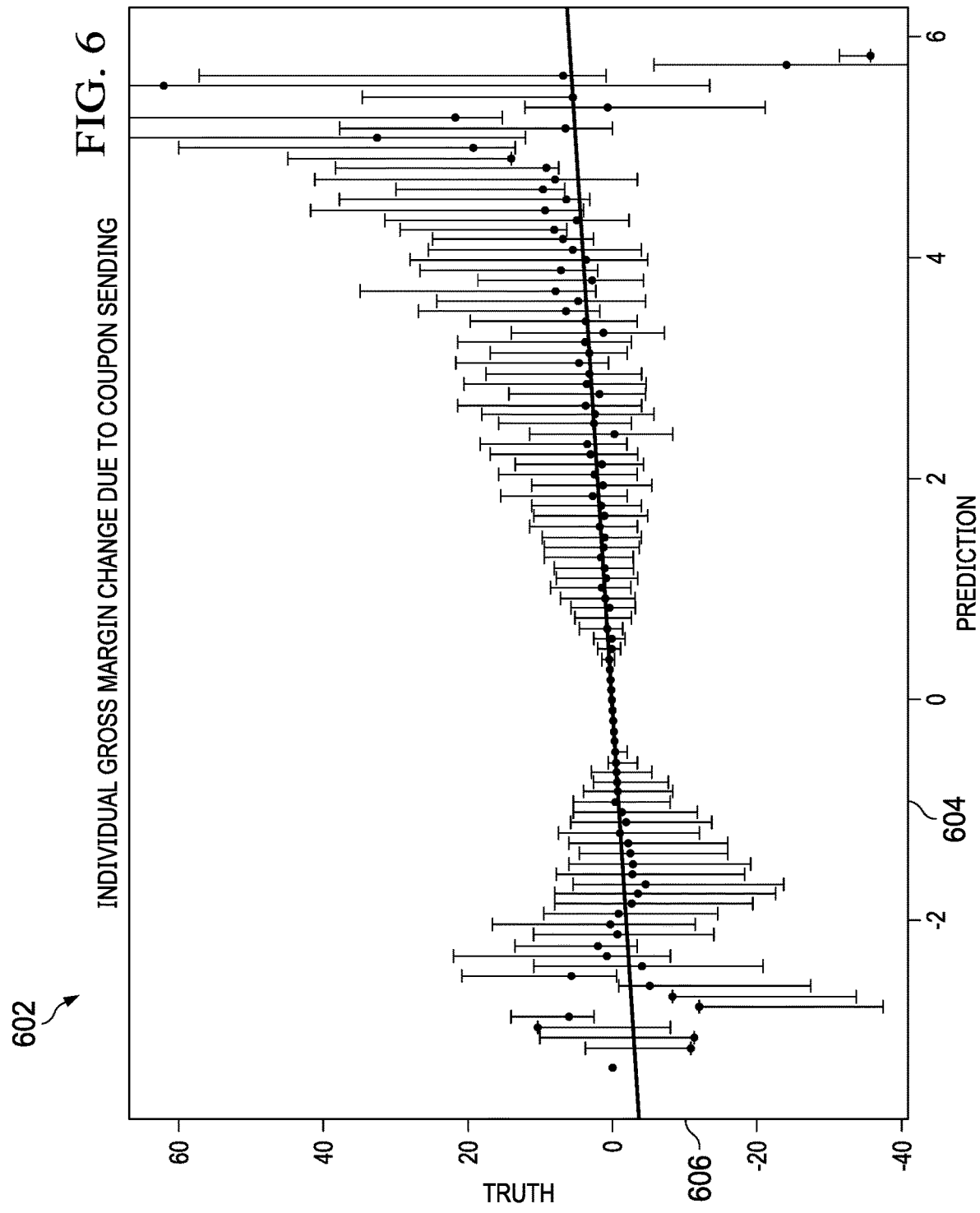
FIG. 6 illustrates an individual causal effect on gross margin display, according to an embodiment.

FIG. 6 illustrates individual causal effect on gross margin display 602, according to an embodiment. Individual causal effect on gross margin display 602 may comprise a profile plot with horizontal axis 604 and vertical axis 606, generated by user interface module 212. Although particular examples of individual causal effect on gross margin displays 602 are illustrated and described, embodiments contemplate user interface module 212 generating individual causal effect on gross margin displays 602 in any configuration, according to particular needs.

Gross margin is a single example of a potential demand quantity; in other embodiments, the use of various other demand quantities is possible as well. In the embodiment illustrated by FIG. 6, the individual causal effect on gross margin display comprises predicted and observed positive or negative causal effects on gross margins from individual customers, which FIG. 6 illustrates with circular data points with vertical range bars, for individual customers who received a discount coupon for in-store purchase use from model training system 110. Although particular examples of individual gross margin displays are illustrated and described herein, embodiments contemplate user interface module 212 accessing model training system 110 database 114 data, including but not limited to predictions data 232 generated by one or more trained models 228, and generating individual displays of any configuration, according to particular needs.

In an embodiment, one or more trained models 228 predict the effect on gross margin of one or more causal variables, such as, for example, issuing one or more coupons for individual customer behavior, and stores the predictions in predictions data 232 of model training system 110 database 114. In this embodiment, user interface module 212 accesses predictions data 232 and displays predictions data 232 in the form of individual causal effect on gross margin displays 602. In an embodiment, horizontal axis 604 of individual causal effect on gross margin displays 602 comprises the predicted individual causal effects, generated by one or more trained models 228, of one or more coupons on individual customer behavior in positive or negative dollars. The circular data points represent the actual observed behavior for each customer. In this embodiment, the circular data points clustered near "0" on horizontal axis 604 indicate customers on which one or more coupons had no effect (for example, customers that received a coupon but still did not enter a store and use the coupon). The circular data points to the left of the "0" on horizontal axis 604 indicate negative gross margin customers (comprising customers who would have entered the store and purchased an item even without receiving one or more coupons, but who used one or more received coupons to purchase items, thereby reducing store revenue). The circular data points to the right of the "0" on horizontal axis 604 indicate positive gross margin customers (comprising customers who would likely not have entered the store and made a purchase absent the incentive of one or more coupons, but who did enter the store and make purchases after receiving one or more coupons).

Figure 7:
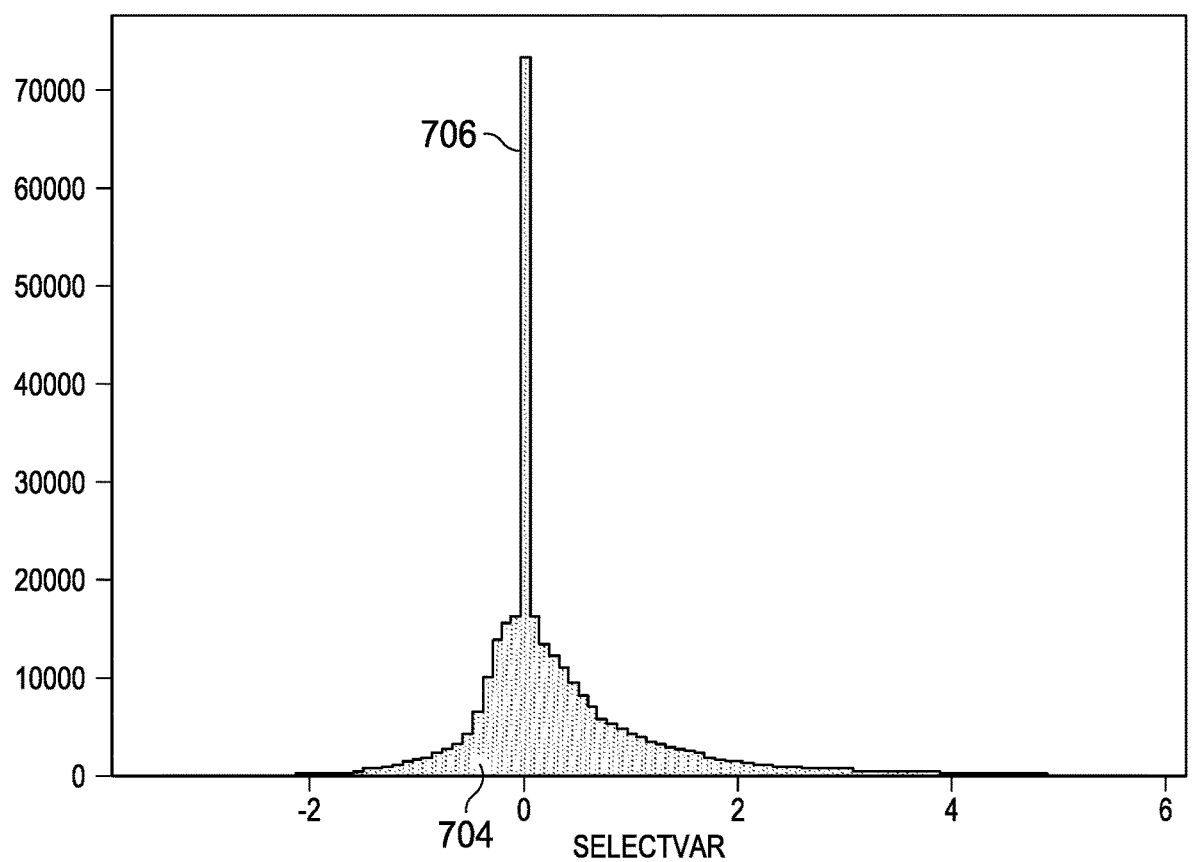
FIG. 7 illustrates an individual causal effect on gross margin histogram, according to an embodiment.

FIG. 7 illustrates individual causal effect on gross margin histogram 702, according to an embodiment. In embodiments, user interface module 212 may generate gross margin histograms 702 in any configuration and displaying any data, according to particular needs. According to embodiments, model training system 110 may execute the actions described above to generate one or more trained models 228 that predict the causal effect of, for example, sending coupons to customers or refraining from doing so, on one or more trained model outputs such as, for example, individual customer gross margin. Prediction module 210 may access current data 230 of model training system 110 database 114, and may use the one or more trained models 228 to generate one or more predictions. Prediction module 210 may store the one or more predictions in predictions data 232, and user interface module 212 may access predictions data 232 and display predictions data 232 as an individual causal effect on gross margin histogram 702, according to an embodiment. In other embodiments, user interface module 212 may display predictions data 232 in any format or configuration, according to particular needs.

In an embodiment, individual causal effect on gross margin histogram 702 comprises positive or negative gross margin predictions 704, illustrated by individual vertical bars representing the number of individual customers who may receive a discount coupon for in-store purchase in a hypothetical scenario. Although particular examples of individual causal effect on gross margin histograms 702 are illustrated and described herein, embodiments contemplate user interface module 212 accessing model training system 110 database 114 data, including but not limited to predictions data 232 generated by one or more trained models 228, and generating individual causal effect on gross margin histograms 702 of any configuration, according to particular needs.

In an embodiment, individual causal effect on gross margin histogram 702 displays the predicted behavior of three groups of customers: customers who receive a coupon but do not use it in a store (illustrated by "0" bar 706); negative gross margin customers who would have purchased an item without a coupon, but used a received coupon to reduce the cost of an item purchase (the bars to the left of "0" bar 706); and positive gross margin customers who would not have otherwise purchased a product, but did so because they received a coupon (the bars to the right of "0" 706) bar. Individual causal effect on gross margin histogram 702, according to the embodiment illustrated by FIG. 7, indicates that because there are slightly more positive gross margin customers than negative gross margin customers in this particular embodiment, the modeled scenario may result in slightly increased purchases. Other scenarios, generated by prediction module 210 and one or more trained models 228 based on other current data 230 and/or other causal variable assumptions, may result in overall negative gross margins, in which the costs incurred in conducting a particular sales promotion exceeds the predicted revenue generated by the sales promotion.

Figure 8A:
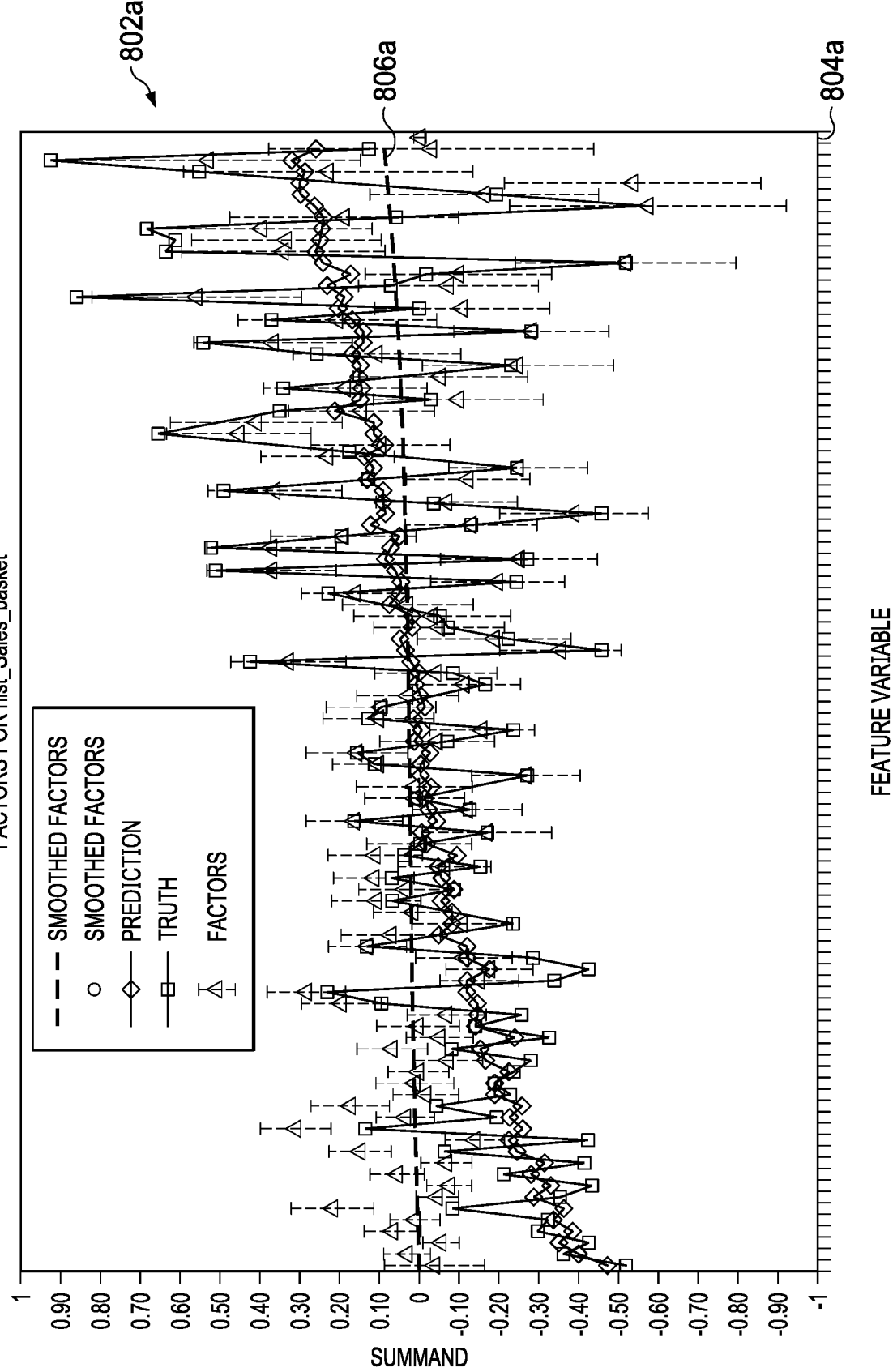
FIGS. 8A-8C illustrate causal effects on gross margin displays, generated by a user interface module and one or more cyclic boosting processes, according to embodiments.
Figure 8B:
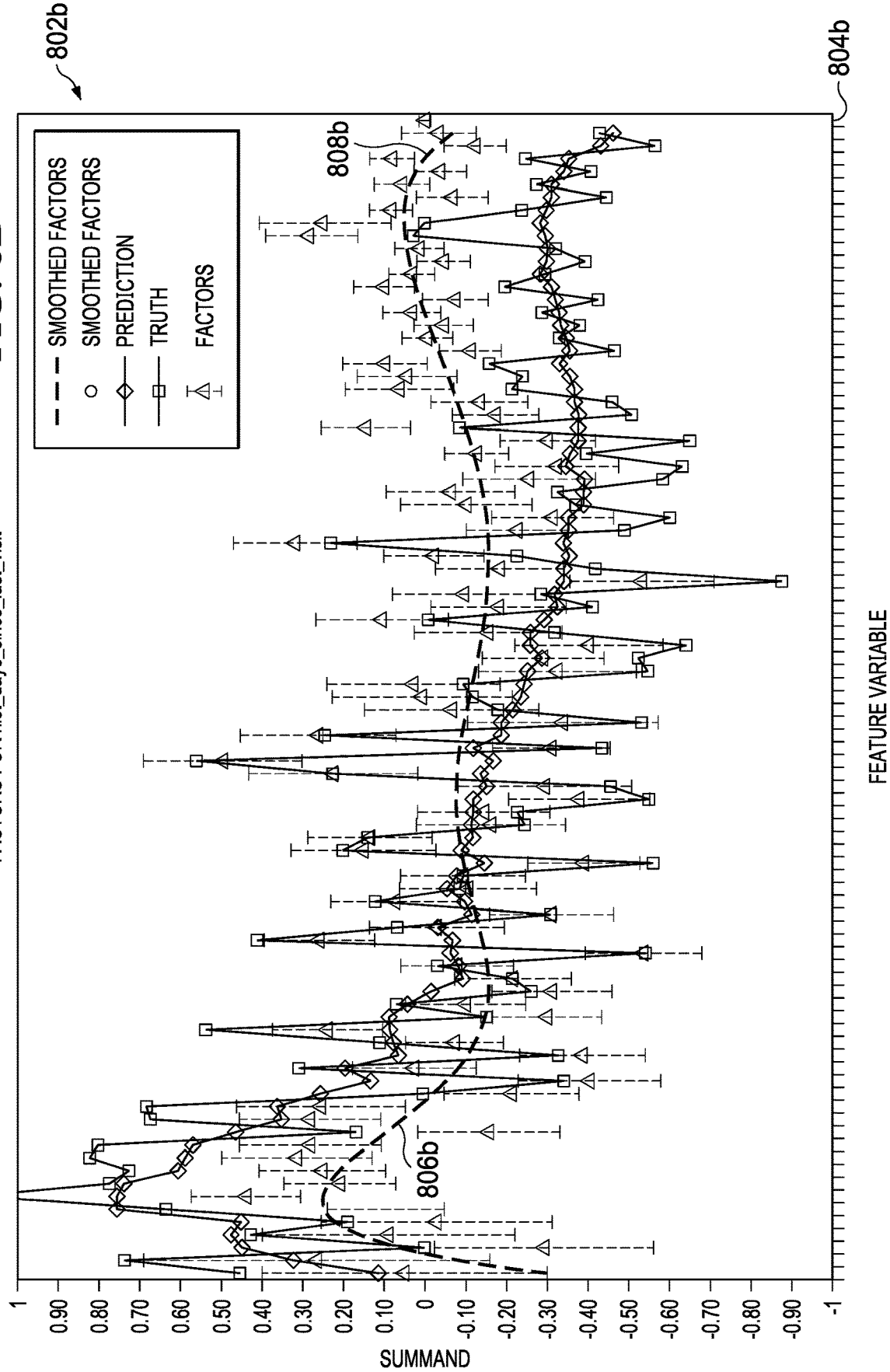
Figure 8C:
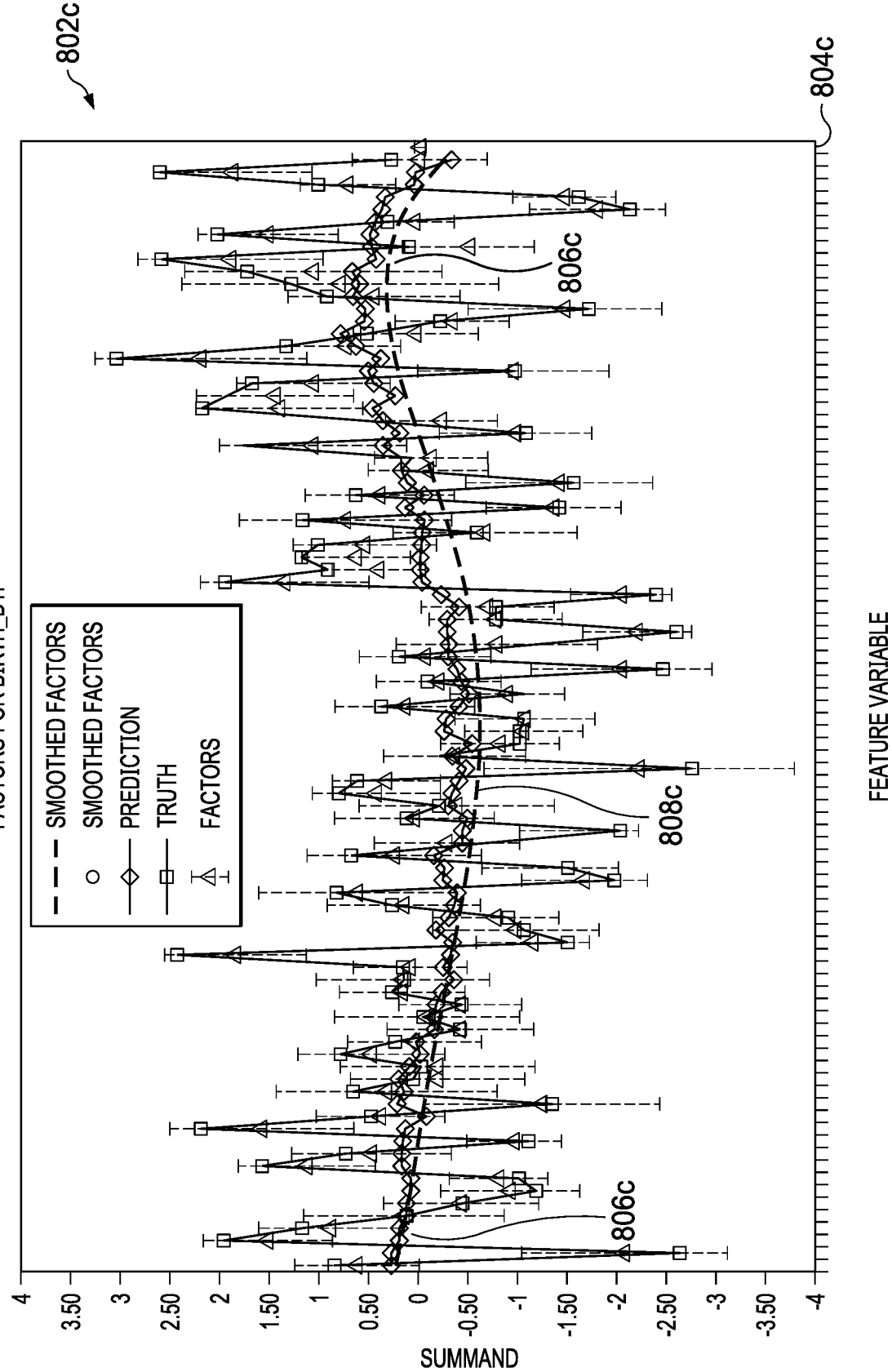

FIGS. 8A-8C illustrate causal effects on gross margin displays 802a-802c generated by user interface module 212 and one or more cyclic boosting processes, according to embodiments. In an embodiment, and as previously described with reference to FIG. 6, causal effects on gross margin displays 802a-802c may comprise predicted and observed positive or negative gross margin effects, which FIGS. 8A-8C illustrate with circular data points with vertical range bars, for different groups of individual customers who received a discount coupon for in-store purchase use from model training system 110. The different variables, for which the correlations to the predicted causal effects due to the causal variables are illustrated by causal effects on gross margin displays 802a-802c, represent a sub-set of the features used in one or more causal factor models 206 and/or trained models 228 (which in these examples use a cyclic boosting in additive regression mode process) and therefore correspond to the causal factors of one or more causal factor models 206 and/or trained models 228 described above. Although particular examples of causal effects on gross margin displays 802a-802c are illustrated and described herein, embodiments contemplate user interface module 212 accessing model training system 110 database 114 data, including but not limited to predictions data 232 generated by one or more trained models 228, and generating causal effects on gross margin displays 802a-802c of any configuration and displaying any data, according to particular needs. Additionally, gross margin is only one example for a demand quantity to be used as target, according to embodiments.

FIG. 8A illustrates causal effects on gross margin display 802a, according to an embodiment. As illustrated by FIG. 8a, the predicted and observed positive and negative causal effects on gross margins of sending coupons to customers with various previous spending habits, according to an embodiment. As illustrated in FIG. 8A, horizontal axis 804a of causal effects on gross margin display 802a arranges each customer based on the volume of the customer's historical in-store purchases, with customers who typically spend more in the store to the right of horizontal axis 804a. In the embodiment illustrated by FIG. 8A, coupons appear to have a small average positive margin effect for customers who typically make high-volume in-store purchases (illustrated in FIG. 8A as positive smoothed factors trend line 806a).

FIG. 8B illustrates causal effects on gross margin display 802b, according to an embodiment. In the embodiment illustrated by FIG. 8B, causal effects on gross margin display 802b illustrates the predicted and observed positive and negative causal effects on gross margins of sending coupons to customers with respect to the frequency with which each customer visits the store, according to an embodiment. As illustrated in FIG. 8B, horizontal axis 804b of causal effects on gross margin display 802b arranges each customer based on the number of elapsed days since the customer's most recent visit, with customers who typically visit the store frequently displayed on the left of horizontal axis 804b and customers that only rarely visit the store on the right of horizontal axis 804b. In the embodiment illustrated by FIG. 8B, coupons appear to have an average positive margin effect for customers who visit the store frequently (illustrated in FIG. 8B as positive smoothed factors trend line 806b on the left side of horizontal axis 804b), and an average negative margin effect for customers who would otherwise visit the store less frequently (illustrated in FIG. 8B as negative smoothed factors trend line 808b in the middle and right side of horizontal axis 804b).

FIG. 8C illustrates causal effects on gross margin display 802c, according to an embodiment. Causal effects on gross margin display 802c illustrates the predicted and observed positive and negative causal effects on gross margins of sending coupons to customers with respect to the age of each customer, according to an embodiment. As illustrated in FIG. 8C, horizontal axis 804c of causal effects on gross margin display 802c arranges each customer based on the age of each customer, with younger customers displayed on the left of horizontal axis 804c and older customers on the right of horizontal axis 804c. In the embodiment illustrated by FIG. 8C, coupons appear to have an average positive margin effect for very young and very old customers (illustrated in FIG. 8C as positive smoothed factors trend lines 806c on the far left and right sides of horizontal axis 804c), and an average negative margin effect for customers of middle age (illustrated in FIG. 8C as negative smoothed factors trend line 808c in the middle of horizontal axis 804c).

According to embodiments, model training system 110 may generate one or more individual causal effect on gross margin displays, in the manner described above, to model one or more causal scenarios in which one or more causal variables are altered from one or more baselines or measured values. One or more individual causal effect on gross margin displays may predict the impact of one or more causal scenarios on various customer demographics, such as, for example, customer age, customer gender, average customer spending, or any other customer demographics. By incorporating the predicted impact of one or more causal scenarios on various customer demographics, model training system 110 may generate one or more new causal variables (such as, for example, a new promotional discount), or may alter one or more existing causal variables, to profitably target defined customer demographics while excluding other customer demographics that may respond with negative gross margins to the new causal variable.

Reference in the foregoing specification to "one embodiment", "an embodiment", or "some embodiments" means that a particular causal factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A computer-implemented method, comprising:
   receiving, with a server comprising a processor and memory, historical sales data for one or more past time periods and corresponding historical data for one or more causal variables;
   deconfounding the cause-effect relationship of historical sales data and historical data on the one or more causal variables by conducting one or more randomized controlled AB group trials that reduce an effect of one or more confounders on one or more variables;
   defining one or more sample weights for statistical background subtraction of the historical data;
   performing statistical background subtraction on the historical data; and
   training, by an iterative approach comprising cyclic boosting in additive regression mode, a first machine learning model to predict an absolute individual causal effect on a considered demand quantity in relation to the one or more causal variables and one or more sample weights.

2. The computer-implemented method of claim 1, further comprising:
   predicting, with the first machine learning model, an absolute individual causal effect on one or more considered demand quantities during a prediction period by training a second machine learning model on historical data, wherein a training period is earlier than the prediction period; and
   rendering, for display on a user interface, a prediction feature explanation visualization comprising a predicted absolute individual causal effect and one or more features identified during the training of the second machine learning model that influence the predicted value.

3. The computer-implemented method of claim 2, wherein the one or more randomized controlled AB group trials comprise the server issuing one or more discount coupons to a subset of a population of customers.

4. The computer-implemented method of claim 2, further comprising:
   performing, with the server, one or more additional training and prediction steps to calculate and apply independence weights by means of inverse propensity scores, estimated by a third machine learning model, to predicting the values of one or more causal variables by including one or more confounding variables as features.

5. The computer-implemented method of claim 2, further comprising:
   defining, with the server, one or more specific feature sequences in combination with a coordinate descent optimization; and
   performing, with the server, one or more regularization and smoothing techniques, incorporating the defined one or more specific feature sequences, during the training of the first machine learning model.

6. A system, comprising:
   a server comprising a processor and memory and configured to:
   receive historical sales data for one or more past time periods and corresponding historical data for one or more causal variables;
   deconfound the cause-effect relationship of historical sales data and historical data on the one or more causal variables by conducting one or more randomized controlled A/B group trials that reduce an effect of one or more confounders on one or more variables;
   define one or more sample weights for statistical background subtraction of the historical data;
   perform statistical background subtraction on the historical data; and
   train, by an iterative approach comprising cyclic boosting in additive regression mode, a first machine learning model to predict an absolute individual causal effect on a considered demand quantity in relation to the one or more causal variables and one or more sample weights.

7. The system of claim 6, further comprising the server:
   predicting, with the first machine learning model, an absolute individual causal effect on one or more considered demand quantities during a prediction period by training a second machine learning model on historical data, wherein a training period is earlier than the prediction period; and
   rendering, for display on a user interface, a prediction feature explanation visualization comprising a predicted absolute individual causal effect and one or more features identified during the training of the second machine learning model that influence the predicted value.

8. The system of claim 7, wherein the one or more randomized controlled AB group trials comprise the server issuing one or more discount coupons to a subset of a population of customers.

9. The system of claim 7, further comprising the server:
   performing one or more additional training and prediction steps to calculate and apply independence weights by means of inverse propensity scores, estimated by a third machine learning model, to predicting the values of one or more causal variables by including one or more confounding variables as features.

10. The system of claim 7, further comprising the server:
    defining one or more specific feature sequences in combination with a coordinate descent optimization; and
    performing one or more regularization and smoothing techniques, incorporating the defined one or more specific feature sequences, during the training of the first machine learning model.

11. A non-transitory computer-readable storage medium embodied with software, the software when executed configured to:
    receive, with a server comprising a processor and memory, historical sales data for one or more past time periods and corresponding historical data for one or more causal variables;
    deconfound the cause-effect relationship of historical sales data and historical data on the one or more causal variables by conducting one or more randomized controlled A/B group trials that reduce an effect of one or more confounders on one or more variables;

define one or more sample weights for statistical background subtraction of the historical data;

perform statistical background subtraction on the historical data; and train, by an iterative approach comprising cyclic boosting in additive regression mode, a first machine learning model to predict an absolute individual causal effect on a considered demand quantity in relation to the one or more causal variables and one or more sample weights.

12. The non-transitory computer-readable storage medium of claim 11, wherein the software when executed is further configured to:

predict, with the first machine learning model, an absolute individual causal effect on one or more considered demand quantities during a prediction period by training a second machine learning model on historical data, wherein a training period is earlier than the prediction period; and render, for display on a user interface, a prediction feature explanation visualization comprising a predicted absolute individual causal effect and one or more features identified during the training of the second machine learning model that influence the predicted value.

13. The non-transitory computer-readable storage medium of claim 12, wherein the one or more randomized controlled AB group trials comprise the server issuing one or more discount coupons to a subset of a population of customers.

14. The non-transitory computer-readable storage medium of claim 12, wherein the software when executed is further configured to:

perform one or more additional training and prediction steps to calculate and apply independence weights by means of inverse propensity scores, estimated by a third machine learning model, to predicting the values of one or more causal variables by including one or more confounding variables as features.

15. The non-transitory computer-readable storage medium of claim 12, wherein the software when executed is further configured to:

define one or more specific feature sequences in combination with a coordinate descent optimization; and perform one or more regularization and smoothing techniques, incorporating the defined one or more specific feature sequences, during the training of the first machine learning model.

\* \* \* \* \*